Figure 1:
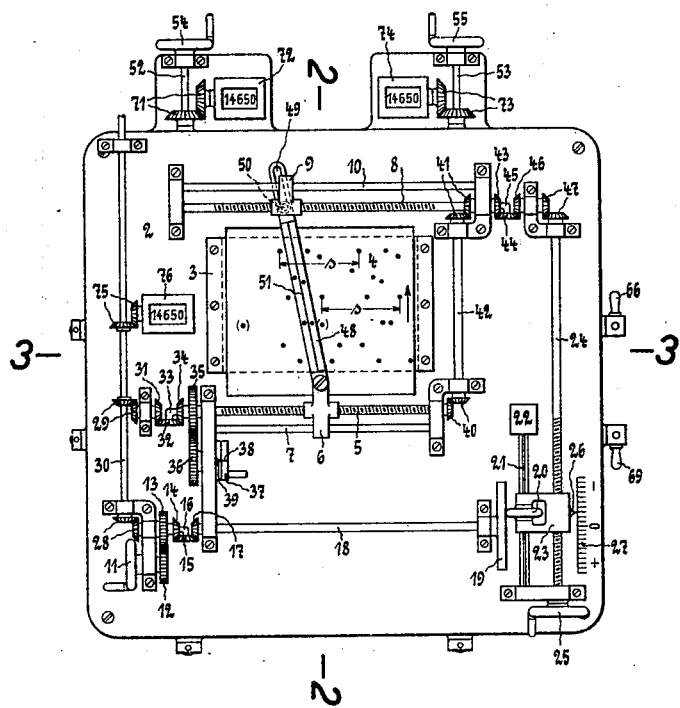

April 24, 1928. W. A. MOUTON 1,666,943

RANGE FINDER

Filed June 8, 1925 2 Sheets-Sheet 1

April 24, 1928.

W. A. MOUTON

RANGE FINDER

Filed June 8, 1925

1,666,943

2 Sheets-Sheet 2

Patented Apr. 24, 1928.

1,666,943

UNITED STATES PATENT OFFICE.

WILLEM ANNE MOUTON, OF THE HAGUE, NETHERLANDS, ASSIGNOR TO N. V. NEDERLANDSCHE INSTRUMENTEN COMPAGNIE, OF THE HAGUE, NETHERLANDS.

RANGE FINDER.

Application filed June 8, 1925, Serial No. 35,839, and in Germany June 12, 1924.

The accuracy of laying guns depends substantially upon exact knowledge of the distance to the target to be fired at. When measuring this distance, either by only using a single range finder or several of them, or when the distance to the target is constant or when in the event of a variable distance to the target the measurements are made at the same time, it has been found that the results do not generally agree owing to the personal mistakes and the defects of the instruments.

Devices have therefore been suggested which will ascertain the mean distance-value at any one time. These devices contain a writing ribbon, movable in a rectilinear direction at an invariable speed, and a marking pencil which is movably disposed parallel to the plane of the writing ribbon and perpendicular to the direction of motion of the writing ribbon and destined to mark the ascertained distances on the writing ribbon. Provided the change of distance related to the unit of time be constant, the mean distance values lie on that straight line, which corresponds best to the travel of the points marked on the writing ribbon. The present mean distance value is represented by the point of intersection of that straight line with a second straight line, which contains the point of the marking pencil and is parallel to the direction of motion of the marking pencil.

In order to free such a device from the drawbacks of the devices already known, which arise in ascertaining the mean distance-value at any one time provision has been made for a mechanical connection of the mechanism serving for this ascertainment with the device for tracing the distances. According to the present invention there is provided a ruler carried by a carriage which is displaceably disposed in the direction of motion of the marking pencil and which, on the one hand, may undergo a manual and, on the other hand, an automatic displacement whose speed is adjustable, and furthermore the arrangement is made in such a way that this ruler is rotatable on the carriage about an axis perpendicular to the direction of motion of the writing ribbon and that of the marking pencil, whereby an arrangement is provided which automatically imparts to the ruler a rotation, on the said speed being varied.

In order to be able to use a writing ribbon of small width, without preventing the tracing of large distances, it is suitable to provide a number of marking pencils, which are disposed on an endless carrying member (e. g. a chain or a band), movable transversely to the direction of motion of the writing ribbon, in such a way that the carrying member is subdivided by these pencils into equal parts, and furthermore means are provided for showing when an additional displacement of the carriage in its direction of displacement, occasionally required owing to the small width of the writing ribbon, is equal to the distance between two adjacent pencils. If the indications of several range finders are to be considered and if thereby it be desirable that alterations of the distances ascertained be automatically transmitted to the device, it is necessary to provide a separate carrying member for each range finder.

The annexed drawing shows a constructional example of a device with two carrying members according to the invention.

Fig. 1 is a plan elevation.

Figure 2:
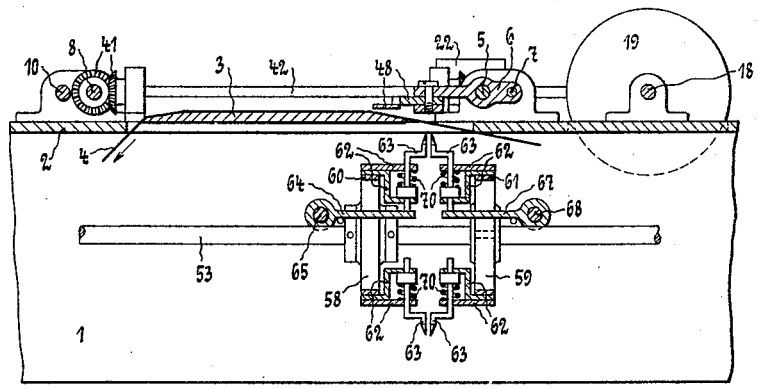
Figure 3:
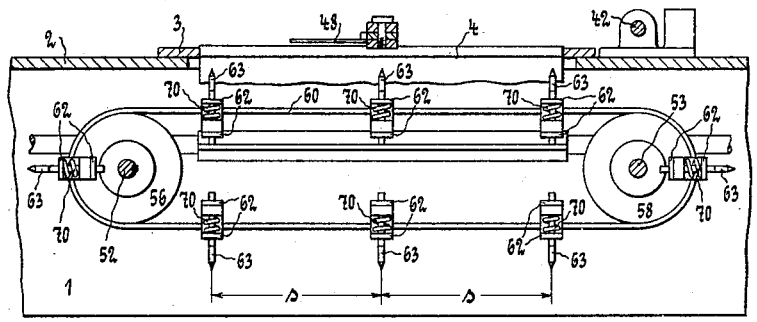

Figs. 2 and 3 are partial sections on an enlarged scale on the lines 2—2 and 3—3 respectively.

Figure 4:
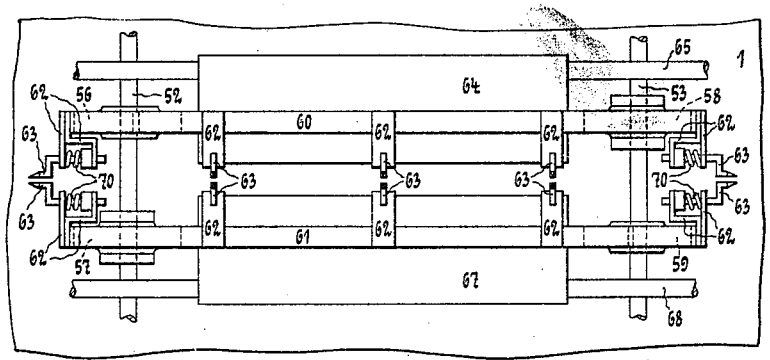

Fig. 4 is a partial plan elevation, also on an enlarged scale with the lid removed.

On a lid 2, adjacent to a casing 1 and provided with a rectangular opening is fixed a guide of sheet-metal 3 which nearly covers this opening with the exception of two slits at each end. A writing ribbon 4, running over two spools disposed in the casing (but not shown in the drawing) and assumed to be uniformly moved by a motor, runs through these two slits over the guide of sheet-metal 3. The direction of motion of the ribbon is indicated by arrows. On the lid 2 is rotatably supported a screw-spindle 5. The latter carries a member 6 which is guided by a rod 7, parallel to the screw-spindle 5 and is thus prevented from rotating. A second screw-spindle 8, which is parallel to the spindle 5, carries a member 9 guided by means of a rod 10.

The two screw spindles 5 and 8 are actuated by the following arrangement. By means of a hand wheel 11 it is possible to rotate a spur gear 12 which meshes with a toothed wheel 13. The latter is rigidly connected to one driving wheel 14 of a differential gear, whose planet pinion 15 is mounted on a curved shaft 16 and whose other driving wheel 17 is rigidly connected to a shaft 18. The latter carries a friction disc 19, engaging with a friction wheel 20, which is disposed on a grooved shaft 21 which may be actuated at a uniform speed by a motor 22. By means of a member 23, by which the friction wheel 20 is adjusted and which engages in a screw-spindle 24, the distance of the friction wheel 20 from the centre of the friction disc 19 can be varied. The spindle 24 is actuated by a hand wheel 25. An index 26 on the member 23 shows on a scale 27 the distance at any one time of the friction wheel 20 from the centre of the disc 19.

The rotations of the curved shaft 16 are transmitted by means of bevel gears 28 and 29 and a shaft 30 to one driving wheel 31 of a second differential gear, whose planet pinion 32 is mounted on a curved part 33 of the screw-spindle 5 and whose other driving wheel 34 is rigidly connected to a toothed wheel 35. This toothed wheel engages in a toothed wheel 36 which can be actuated by a friction disc 37 provided with an index 38, coacting with an index 39 fixed on the bearing of the wheel 36. The rotations of the screw-spindle 5 are transmitted by means of two pairs of bevel wheels 40 and 41 and a shaft 42 to one driving wheel 43 of a third differential gear, whose planet pinion 44 is mounted on a curved part 45 of the screw-spindle 8 and whose other driving wheel 46 is actuated from the screw-spindle 24 by a pair of bevel wheels 47. On the member 6 is rotatably supported a ruler 48 having a slot 49 in which engages a pivot 50 on the member 9. The middle part of the ruler 48 consists of celluloid and contains a line 51 passing through the axis of rotation of the ruler and the axis of the pivot 50.

The following arrangement serves for marking the distances on the writing ribbon 4. In the casing 1 two shafts 52 and 53 are rotatably disposed transversely to the shafts 5 and 8. The shaft 52 can be actuated with the aid of a hand wheel 54 and the shaft 53 by means of the hand wheel 55. On the shaft 52 symmetrically to the plane containing the axis of rotation of the ruler 48 and which is parallel to the screw-spindle 5, are mounted two equally large discs 56 and 57. The disc 56 is rigidly connected to the shaft 52, whilst the disc 57 is easily rotatable. On the shaft 53 are mounted two discs 58 and 59, whose diameter is the same as that of the discs 56 and 57 and of which the disc 58, which is opposite the disc 56, is easily rotatably disposed, whilst the disc 59, which is opposite the disc 57, is rigidly connected to the shaft 53. Over the discs 56 and 58 is stretched and endless steel band 60 and over the discs 57 and 59 an endless steel band 61. Each steel band carries eight holders 62, each of which receives a marking pencil 63, and which are spaced equidistantly from each other. Besides, the arrangement has been made in such a way that both the points of the eight marking pencils of the band 60 and the points of the eight marking pencils of the band 61 are directly adjacent to a plane, which contains the axis of rotation of the ruler 48 and is parallel to the screw-spindle 5, so that, on neglecting the short distance of the points of the marking pencils from this plane, there exists practically the case that the points of the marking pencils lie in this plane itself. The marking pencils are displaceably disposed in their holders in a perpendicular direction to the band. By means of a plate 64, which is fixed on a shaft 65 and which can be rotated by a handle 66 fixed to this shaft, it is possible to lift simultaneously those marking pencils 63 of the band 60, which happen to be below the writing ribbon 4, in such a way that they mark one point each on the writing ribbon. (In the example the marking pencils have been assumed to be needles. Hence, in this case the marking is effected by marking a hole into the writing ribbon). A second plate 67, which is fixed on a shaft 68 and which can be rotated by means of a handle 69, enables the user to actuate the marking pencils 63 of the ribbon 61 correspondingly. A spring 70 serves to return the marking pencils.

It has been arranged that the width of the writing ribbon 4 is a little larger than $2\ s$ (whereby $s$ is the distance between the markers). Therefore, at least two and at the most three marking pencils simultaneously act upon the writing ribbon. In the present case it should be assumed that the distance $s$ represents on the tracing scale a distance of 2000 m. Hence, a displacement of each steel band by the amount $s$ corresponds to an alteration of the distance by 2000 m. All points, simultaneously marked on the writing ribbon by the marking pencils 63 of one and the same steel band, correspond to one and the same distance measured. In order to indicate this distance, the rotations of the shaft 52 are transmitted by means of a pair of bevel wheels 71 to a counting device 72 and the rotations of the shaft 53 by means of a pair of bevel wheels 73 to a counting device 74. If the ruler 48 be so adjusted that its longitudinal line 51 corresponds best to the travel of the points marked on the writing ribbon 4, the position of its axis of rotation corresponds to the present mean distance value. In order to indicate this value the rotations of the shaft 30 are transmitted by means of a pair of bevel wheels 75 to a counting device 76. The two counting devices 72 and 74 are assumed to be adjusted in such a way that if the point of a marking pencil of the one steel band (on neglecting the short distance of the points of the marking pencils from the said plane, which contains the axis of rotation of the ruler 48 and is parallel to the screw-spindle 5) coincides with the point of a marking pencil of the other steel band, either the same distance is indicated on both, or that the distances indicated differ by 2000 m. or by a multiple of 2000 m. Moreover, the counting device 76 is assumed to be adjusted in such a way that, if the counting devices 72 and 74 indicate equal distances and if the axis of rotation of the ruler 48 coincides with the point of a marking pencil of the steel band 60 and with the point of a marking pencil of the steel band 61 (again supposing the said neglect) it indicates the same distance as these two counting devices 72 and 74. This special case is represented in the drawing.

The described arrangement of the differential gear 31, 32, 34 with the toothed wheel gear 35, 36 and the actuating disc 37 as well as the indices 38 and 39 serves the purpose of enabling the user to displace the ruler 48 by the amount $s$ parallel to itself, without the counting device 76 being affected by this displacement. Thereby the arrangement is assumed to be made in such a way that two complete revolutions of the actuating disc 37 (the mark of distinction for complete revolution is formed by the indices 38 and 39) cause a displacement of the ruler 48 parallel to itself by the amout $s$. (By selecting a suitable gearing this arrangement might easily be modified in such a way that a single revolution of the actuating disc 37 causes the said displacement of the ruler by the amount $s$.)

If it be assumed that the indications of only two range finders (I and II) are to be traced, the device is to be operated as follows. First of all the writing ribbon 4 is to be put in uniform motion. As soon as a distance is indicated by the range finder I, the steel band 60 is to be so adjusted by rotating the hand wheel 54 that the counting device indicates this distance shown, and by actuating the handle 66 the pressure plate 64 is by means of a short pressure to be pressed against the marking pencils 63 of the steel band 60 within its reach, so that by each of these marking pencils a point is marked on the writing ribbon 4. By means of the appertaining springs 70 the marking pencils are then at once removed again from the writing ribbon 4. If a distance be reported by the range finder II the steel band 61 must be adjusted, by rotating the hand wheel 55, in such a way that the counting device 74 indicates this distance reported, and by actuating the handle 69 the pressure plate 67 is by means of a short pressure to be pressed against the marking pencils of the steel band 61 within its reach, so that by each of these marking pencils a point is marked. By means of the appertaining springs 70 the marking pencils are then at once removed again from the writing ribbon 4. These adjustments must be repeated with each new report of measurements made by the range finders I and II.

A number of tracings having thus been made, it is necessary to put the motor 22 in motion and to adjust the member 9, by rotating the hand wheel 25, relatively to the member 6 in such a way that the line 51 of the ruler 48 will be parallel to the line, which is assumed to be laid through the points traced and which corresponds best to the course of the points. Moreover, by rotating the hand wheel 11 the ruler is displaced parallel to itself in such a way that its longitudinal line coincides with the said line. With these two adjustments the points, which lie quite apart and which are evidently due to erroneous measurements (notice the points enclosed in brackets in Fig. 1) are not to be considered. If the said line embraces with the screw-spindle 5 an angle deviating from 90°, the distance measured increases or decreases in course of time (in the position of the ruler shown in the drawing the distance has increased). In this case the friction wheel 20 has, by rotating the hand wheel 25, assumed a position in which it has from the centre of the friction disc 19 a certain definite distance deviating from zero, which is indicated on the scale 27 by the index 26 and corresponds to the existing difference in distance in the unit of time. According as the friction wheel 20 is in a position above or below the centre of the friction disc 19 (see Fig. 1), the distance indicated on the scale 27 corresponds to an increase or a decrease of the distance. To an increase corresponds a motion of the ruler from the left to the right, to a decrease the reversed motion. If the friction wheel 20 be adjusted to the centre of the friction disc 19 and therefore the distance indicated on the scale, corresponding to a constant distance, equal to zero, no motion at all is transmitted by the ruler to the motor. In this case the ruler must, of course, be directed perpendicular to the screw-spindle 5. Owing to this distance the screw-spindles 5 and 8, in the case of a suitable election of the number of revolutions of the motor 22, impart to the members 6 and 9 such a displacement that the line 51 continuously coincides with the said line. The counting device thereby always indicates the mean distance-value at any one time. By uniting the shaft 30 with a device in which this value is used, the latter can be permanently introduced into this device.

As at least two groups of points are continuously traced, which exactly correspond to each other and which are only displaced relatively to each other by the distance *s*, it is possible, if the axis of rotation of the ruler has reached the one or the other side of the writing ribbon 4, to adjust by means of a displacement of the ruler parallel to itself by the amount *s* the line 51 to the line corresponding to the second group of points, so that in spite of the narrow writing ribbon even the greatest variations of the distance will not be objectionable. This displacement of the ruler must be effected by means of the actuating disc 37 by imparting to the latter exactly two revolutions from that position in which the two indices 38 and 39 are opposite each other.

I claim:

1. Device for ascertaining of a number of distance-values the mean value appertaining to a certain definite period, containing a writing ribbon, movable in a rectilinear direction, a marking device, which is movably disposed parallel to the plane of the writing ribbon and perpendicular to the direction of motion of the writing ribbon and adapted to mark on the writing ribbon the distance-values, a carriage which is displaceably disposed parallel to the direction of motion of the marking device, a ruler carried by the said carriage, means for imparting to the carriage a displacement by hand, other means for imparting to the carriage an automatic displacement, means for adjusting the speed of this automatic displacement, the ruler being disposed on the carriage movable about an axis which is perpendicular to the direction of motion of the writing ribbon and to that of the marking device, and means for automatically imparting to the ruler an angular displacement, on the said speed being altered.

2. Device for ascertaining of a number of distance-values the means value appertaining to a certain definite period, containing a writing ribbon, movable in a rectilinear direction, an endless carrying member stretched transversely to the direction of motion of the writing ribbon and movably disposed, a plurality of marking pencils disposed on the said band at equal distances, the said pencils being adapted to mark on the writing ribbon the distance-values, a carriage which is displaceably disposed parallel to the direction of motion of the marking pencils, a ruler carried by the said carriage, means for imparting to the carriage a displacement by hand, other means for imparting to the carriage an automatic displacement, means for adjusting the speed of this automatic displacement, the ruler being disposed on the carriage movable about an axis which is perpendicular to the direction of motion of the writing ribbon and to that of the marking pencils, means for automatically imparting to the ruler an angular displacement on the said speed being altered, and an indicating device adapted to show, when a displacement of the said carriage has been effected in its direction of displacement, equal to the distance apart of two marking pencils each.

WILLEM ANNE MOUTON.